United States Patent
Ringland et al.

(10) Patent No.: US 10,231,177 B2
(45) Date of Patent: Mar. 12, 2019

(54) INTERFACE SELECTION IN A WIRELESS ROUTER

(71) Applicant: British Telecommunications Public Limited Company, London (GB)

(72) Inventors: Simon Ringland, London (GB); Francis Scahill, London (GB); Richard Evenden, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/561,450

(22) PCT Filed: Mar. 30, 2016

(86) PCT No.: PCT/EP2016/056970
§ 371 (c)(1),
(2) Date: Sep. 25, 2017

(87) PCT Pub. No.: WO2016/156439
PCT Pub. Date: Oct. 6, 2016

(65) Prior Publication Data
US 2018/0124693 A1    May 3, 2018

(30) Foreign Application Priority Data

Mar. 31, 2015   (EP) .................................... 15161966

(51) Int. Cl.
*H04W 48/18*      (2009.01)
*H04W 88/10*      (2009.01)
*H04W 40/12*      (2009.01)

(52) U.S. Cl.
CPC ........... *H04W 48/18* (2013.01); *H04W 40/12* (2013.01); *H04W 88/10* (2013.01)

(58) Field of Classification Search
CPC ...... H04W 48/18; H04W 40/12; H04W 88/10
(Continued)

(56) References Cited

U.S. PATENT DOCUMENTS

2005/0147049 A1   7/2005   Ganesan
2007/0104218 A1   5/2007   Hassan et al.
(Continued)

FOREIGN PATENT DOCUMENTS

EP           2709418 A2   3/2014
WO   WO 2008/066928 A2   6/2008
(Continued)

OTHER PUBLICATIONS

International Search Report for corresponding International Application No. PCT/EP2016/056970 dated Jun. 9, 2016; 4 pages.
(Continued)

*Primary Examiner* — Eugene Yun
(74) *Attorney, Agent, or Firm* — Amy M. Salmela; Patterson Thuente Pedersen, P.A.

(57) ABSTRACT

A wireless router having a WiFi wireless network and including a small cell for routing LTE cellular data to a mobile network core is configured to monitor connected mobile devices and determine whether each mobile device should be connect to the hub using WiFi or LTE in accordance with the current utilization of the WiFi network and the current utilization of the LTE small cell. The network identity information of the device's WiFi interface and the device's LTE interface is provided by an application operating on the mobile device.

7 Claims, 5 Drawing Sheets

(58) Field of Classification Search
USPC ............................................ 455/561
See application file for complete search history.

(56) References Cited

U.S. PATENT DOCUMENTS

| | | |
|---|---|---|
| 2010/0118842 A1 | 5/2010 | Kalhan |
| 2012/0188949 A1 | 7/2012 | Salkintzis et al. |
| 2013/0083661 A1 | 4/2013 | Gupta |
| 2013/0329714 A1 | 12/2013 | Fan et al. |
| 2014/0241316 A1 | 8/2014 | Okmyanskiy et al. |
| 2014/0341023 A1 | 11/2014 | Kim et al. |
| 2014/0369329 A1 | 12/2014 | Lee et al. |
| 2018/0109998 A1 | 4/2018 | Ringland et al. |

FOREIGN PATENT DOCUMENTS

| | | |
|---|---|---|
| WO | WO 2012/166671 A1 | 12/2012 |
| WO | WO 2013/006199 A1 | 1/2013 |
| WO | WO 2013/176588 A1 | 11/2013 |
| WO | WO 2016/156425 A1 | 10/2016 |
| WO | WO 2016/156430 A1 | 10/2016 |

OTHER PUBLICATIONS

Written Opinion of the International Searching Authority for corresponding International Application No. PCT/EP2016/056970 dated Jun. 9, 2016; 13 pages.
U.S. Appl. No. 15/562,302, filed Sep. 27, 2017, Inventor(s): Scahill et al.
U.S. Appl. No. 15/562,229, filed Sep. 27, 2017, Inventor(s): Ringland et al.
U.S. Appl. No. 15/562,847, filed Sep. 28, 2017, Inventor(s): Ringland et al.
International Preliminary Report on Patentability, Application No. PCT/EP2016/056952, dated Oct. 3, 2017, 9 pages.
International Search Report, Application No. PCT/EP2016/056952, dated May 5, 2016, 4 pages.
"Small Cell Forum Ltd Integrated Fem to-WiFi (IFW) Networks", Feb. 28, 2012 (Feb. 28, 2012), XP055145624, Retrieved from the Internet: URL: http://www.smallcellforum.org/smallcellforum_resources/pdfsend01.php?file=Integrated-Femto-WiFi-Networks-WhitePaper_sm.pdf.
International Preliminary Report on Patentability, Application No. PCT/EP2016/056970, dated Oct. 3, 2017, 14 pages.
International Preliminary Report on Patentability, Application No. PCT/EP2016/056958, dated Oct. 3, 2017, 8 pages.
International Search Report, Application No. PCT/EP2016/056958, dated Jun. 1, 2016, 5 pages.
3rd Generation Partnership Project (3GPP TR 37.870 V0.5.0); Technical Specification Group Radio Access Network; Study on Multi-RAT joint coordination (Release 13). 650. Route Des Lucioles ; F-06921 Sophia-Antipolis Cedex ; France. Feb. 2015. pp. 1-22.
International Preliminary Report on Patentability, Application No. PCT/EP2016/056967, dated Oct. 3, 2017, 9 pages.
International Search Report, Application No. PCT/EP2016/056967, dated Jun. 10, 2016, 5 pages.
Kobayashi, et al.; Internet Engineering Task Force (IETF); IP Flow Information Export (IPFIX) Mediation: Framework; ISSN: 2070-1721; Apr. 2011; 29 pages.
Raiciu, et al.; Internet Engineering Task Force (IETF); Coupled Congestion Control for Multipath Transport Protocols; ISSN: 2070-1721; Oct. 2011; 12 pages.
Ford, et al.; Internet Engineering Task Force (IETF); TCP Extensions for Multipath Operation with Multiple Addresses; ISSN: 2070-1721; Jan. 2013; 64 pages.
Simsek et al.; IEEE ICC 2013—Wireless Communications Symposium; "Rethinking Offload: How to Intelligently Combine WiFi and Small Cells?"; 978-1-4673-3122-7/13; pp. 5204-5208 (5 pages total).
Elsherif et al.; IEEE ICC 2013—Wireless Communications Symposium; "Adaptive Small Cell Access of Licensed and Unlicensed Bands" 978-1-4673-3122-7/13; pp. 6327-6332 (6 pages total).
Small Cell Forum; Release Four; Document 033.04.01 "Integrated Femto-WiFi (IFW) Networks"; Dec. 1, 2013; www.smallcellforum.org; 37 pages.

INTERFACE SELECTION IN A WIRELESS ROUTER

CROSS-REFERENCE TO RELATED APPLICATIONS

The present application is a National Phase entry of PCT Application No. PCT/EP2016/056970, filed on 30 Mar. 2016, which claims priority to EP Patent Application No. 15161966.5, filed on 31 Mar. 2015, which are hereby fully incorporated herein by reference.

TECHNICAL FIELD

The present disclosure relates to data networks and in particular to a method and apparatus for selecting a network interface for use by a mobile device.

BACKGROUND

A typical broadband setup involves a router device with a Digital Subscriber Line (DSL) or cable link to an Internet Service Provider (ISP) connected to wide area networks such as the Internet and resources such as file/video/content servers and other correspondent nodes.

Typically, many mobile devices do not have wired interfaces such as Ethernet to connect to the router using a wired connection. To address this, and to provide flexible connectivity, the IEEE 802.11 family of standards relating to "Wi-Fi" is now a popular system for allowing computing devices to communicate wirelessly using radio wave transmission. Groups of computing devices all communicating via a common wireless access point are known as wireless local area networks (WLANs).

In such systems, when a mobile device is in communication with a correspondent node, application data is sent in IP data packets from a mobile device to the wireless access point via Wi-Fi, from the router to the ISP core network via xDSL and from the ISP core to wide area network protocols to reach the correspondent node.

Mobile/Cellular networks also provide data connectivity although typically over a wide area instead of local area in WLANs. Mobile Network Operators (MNOs) maintain Public Land Mobile Networks (PLMNs) formed of a number of radio base stations known as macrocells connected to a network core which provides control functions as well as connectivity to wide area networks such as the Internet. An example of a cellular network protocol is Long Term Evolution (LTE) sometimes known as 4G.

In order to supplement the coverage of macrocells, shorter range base stations such as picocells and femtocells, collectively known as small cells, are being deployed. In addition to the smaller geographical coverage, the small cells differ from macrocells in that they are connected to the mobile network core, an Evolved Packet Core (EPC) in LTE, using a broadband connection instead of dedicated cabling. This allows LTE small cells to be co-located or even integrated into a wireless access point router device.

In LTE small cells, when a mobile device is in communication with a correspondent node using a small cell instead of Wi-Fi, application data is sent in IP data packets from the mobile device to the small cell in the router via LTE, from the router to the ISP core network via xDSL, from the ISP core to a mobile network core, and from the mobile network core to a, or a number of, wide area networks to reach the correspondent node.

Today there are many mobile devices which combine both Wi-Fi and Cellular (LTE in particular) radios allowing the ability to connect to wide area network resources via both Wi-Fi and cellular protocols. Typically, the mobile devices are configured to only use one of the wireless technologies at any given time to save power. Therefore when both types of wireless network are available, a decision must be made over which connection to use in any given circumstance.

The general behavior is for the device to select Wi-Fi in preference to cellular whenever it is available. Whilst this is a simple decision, it can be inefficient as this behavior takes no account of the quality of connection available on each radio and also takes no account of the overall loading on each network.

SUMMARY

The present disclosure accordingly provides, in a first aspect, an apparatus for selecting a data communication interface to be used by a mobile device having at least a wireless network interface connected to a wireless data network associated with the apparatus, and a cellular network interface connected to a cellular data network, the apparatus comprising: a wireless network interface; a cellular access base station; network identification means for determining a network address identifier associated with each of the network interfaces of the mobile device; means for determining first network operation parameters of the wireless data network; means for determining second network operation parameters of the cellular network interface of the mobile device; a controller for selecting one of the wireless network interface and the cellular network interface in accordance with the determined first and second network operation parameters; and means for causing the mobile device to use the selected network interface.

The present disclosure accordingly provides, in a second aspect, a method of selecting a data communication interface to be used by a mobile device having at least a wireless network interface connected to a wireless data network, and a cellular network interface connected to a cellular data network, the method comprising: determining a network address identifier associated with each of the network interfaces of the mobile device; determining first network operation parameters of the wireless data network; determining second network operation parameters of the cellular network interface of the mobile device; selecting one of the wireless network interface and the cellular network interface in accordance with the determined first and second network operation parameters; and causing the mobile device to use the selected network interface.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which.

DETAILED DESCRIPTION

Figure 1:
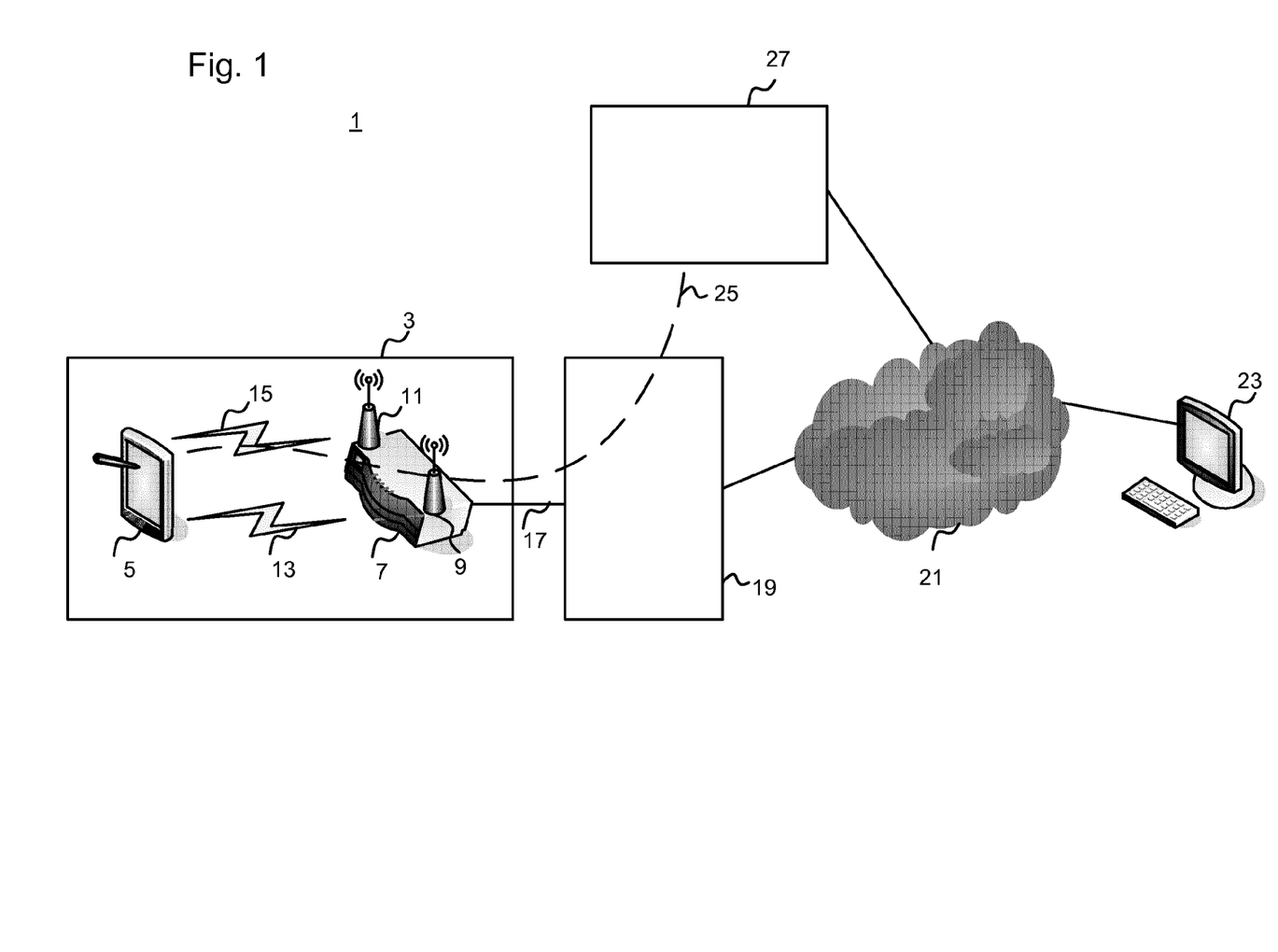
FIG. 1 schematically shows an example network architecture according to a first embodiment.

FIG. 1 provides an overview of a data network 1 in accordance with the first embodiment. Within a user premises 3 such as a home or office environment, a mobile device 5 such as a mobile phone, tablet or laptop is shown connected to an integrated wireless access point, small cell and router device 7, hereinafter referred to as a hub 7.

The hub 7 contains a WiFi access point 9 which generates and maintains a wireless local area network (WLAN) in accordance with a WiFi protocol such as IEEE 802.11ac for a surrounding area, such as the user premises 3, to enable the mobile device 5 to connect and communicate with the hub 7 via the WLAN.

The hub 7 also contains a small cell 11 which provides LTE data connectivity to the user device 5 within a small zone around the hub 7. For ease of explanation, the range of the small cell 11 is assumed to be limited to the extent of the user premises 3.

The mobile device 5 therefore has data connections to the hub 7 and can create a data path to any correspondent node 23 via two types of wireless protocol, in this case a WiFi data link 13 which initially carries WiFi data packets 13 and cellular network data link 15 which starts with data packets transferred via LTE to the small cell 11 associated with the hub 7 and tunneled to the cellular network data core 27.

The hub 7 generally functions as a routing device for data transfer between any connected local devices 5 and also connects those devices 5 to resources on wide area networks such as the Internet 21. The hub contains a wide area network interface, in this embodiment, an xDSL modem for communication over a copper and/or optical fiber link 17 to an ISP core network 19 which itself provides links to wide area network 21 resources such as the Internet and correspondent nodes 23 such as video servers, file servers and other users, etc.

The ISP core 19 contains the termination points for the copper/fiber link 17 and functionality to connect the hub 7 data sessions to resources available on wide area networks such as the Internet 21. Billing and user authentication is also handled by the ISP core 19.

Although the WiFi link 13 and LTE link 15 are both wireless links from the mobile device 5 which traverse the hub 7, the onward processing of data packets within those links is handled differently.

For WiFi, the packets are forwarded to the ISP core 19 which is responsible for forwarding the data to a packet destination, such as the correspondent node 23 via the Internet 21.

In contrast, the small cell 11 has similar functionality to a short range cellular network macrocell and therefore a mobile device 5 will link to the small cell 11 in accordance with standard LTE handover and idle mode reselection procedures. The small cell 11 maintains a data tunnel 25, for example using Generic Routing Encapsulation (GRE) and IPSec, to a cellular network core 27. Data packets from the mobile device 5 travel via the LTE link 15 to the small cell 11 and then through the tunnel 25 via the hub 7 and the ISP core 19 to the cellular network core 27 which is responsible for routing data to the Internet 21 and correspondent node 23.

As a result, there are two logically separate data paths between the mobile device 5 and the correspondent node 23 and data packets in the paths will both travel from the mobile device 5 through the hub 7 and the network core 19 but then take different paths on the way to the correspondent node 19.

A conventional mobile device 5 will only use one interface at a time, i.e. only the WiFi link 13 or only the LTE link 15. Furthermore, the standard behavior is that if WiFi functionality is enabled on the mobile device 5 and a working WiFi network connection is available, then the mobile device 5 will use the WiFi link 13 in preference to the LTE link 15. The LTE function is usually disabled on the mobile device to save power.

Overview of the Processing of an Embodiment

In summary, the processing in the first embodiment relates to a hub 7 configured to control which wireless protocol interface a mobile device 5 uses to connect to external network 21 resources. Unlike the conventional situation where a mobile device 5 itself or the user of the device decides which interface to use, the hub 7 determines which interface should be used based on the network utilization of each interface by other devices connected to the same local network. Furthermore methods are described for determining the network identifiers of a device on WiFi and LTE so that data sessions can be redirected.

The steering procedure can be carried out at any time rather than just at the initial connection. For example, the hub 7 can re-evaluate the connections every few minutes. In another case, any time a new device 5 tries to connect to the hub 5, the connections for all devices 5 are re-evaluated.

Description of the Components

In the first embodiment, the connection selection and steering functionality of the hub 7 relies on interaction between an application installed on the mobile device 5. Therefore the structure and components of the hub 7 and mobile device 5 will be described briefly before a discussion of the interaction between the functional components of the small cell 5 and hub 7.

Figure 2:
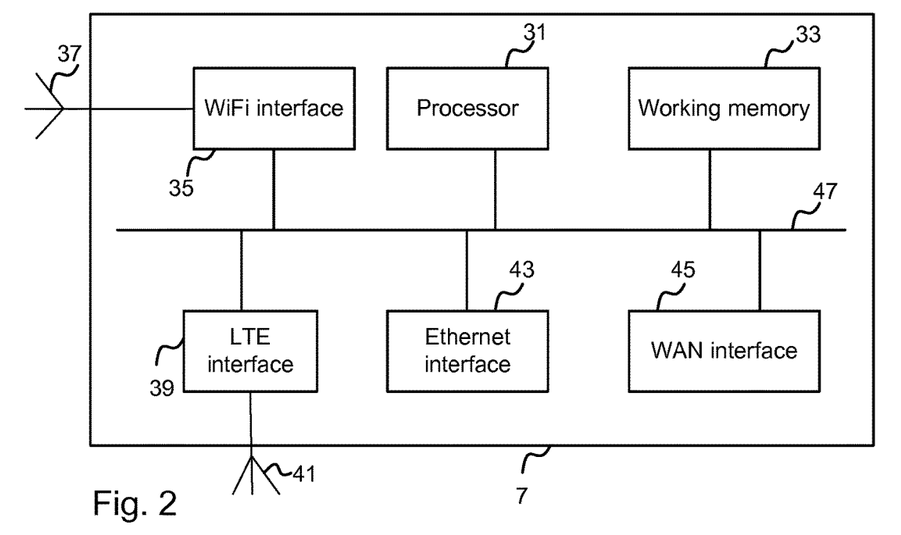
FIG. 2 schematically shows the physical components of a hub device for managing data connections to local devices.

FIG. 2 shows the physical components of a hub 7 device according to the first embodiment. As shown the hub 7 has a central processor 31 for controlling the overall operation of the hub 7 in accordance with processing instructions stored in a memory store 33 which is a combination of Random Access Memory (RAM) and also Read Only Memory (ROM).

For connectivity with external devices, the hub 7 also includes wireless and wired network interfaces. A WiFi controller 35 and a WiFi antenna 37 provides wireless local area network (WLAN) connectivity and in this embodiment, a small cell controller 39 and LTE antenna 41 are integrated into the hub 7 for providing cellular network access. The hub 7 also includes an Ethernet interface 43 for connecting to wired devices.

The hub 7 also includes a wide area network controller 45, in this embodiment, a Very High bit-rate Digital Subscriber Line (VDSL) modem which provides connectivity to wide area networks such as the Internet 21 and ISP core 19 services over a copper twisted pair and fiber line. The components are all interconnected via an internal data bus 47.

When computer instructions stored in the working memory 33 are executed by the processor 31, the hub 7 can be regarded as a number of functional units involving a combination of hardware and software processing.

Figure 3:
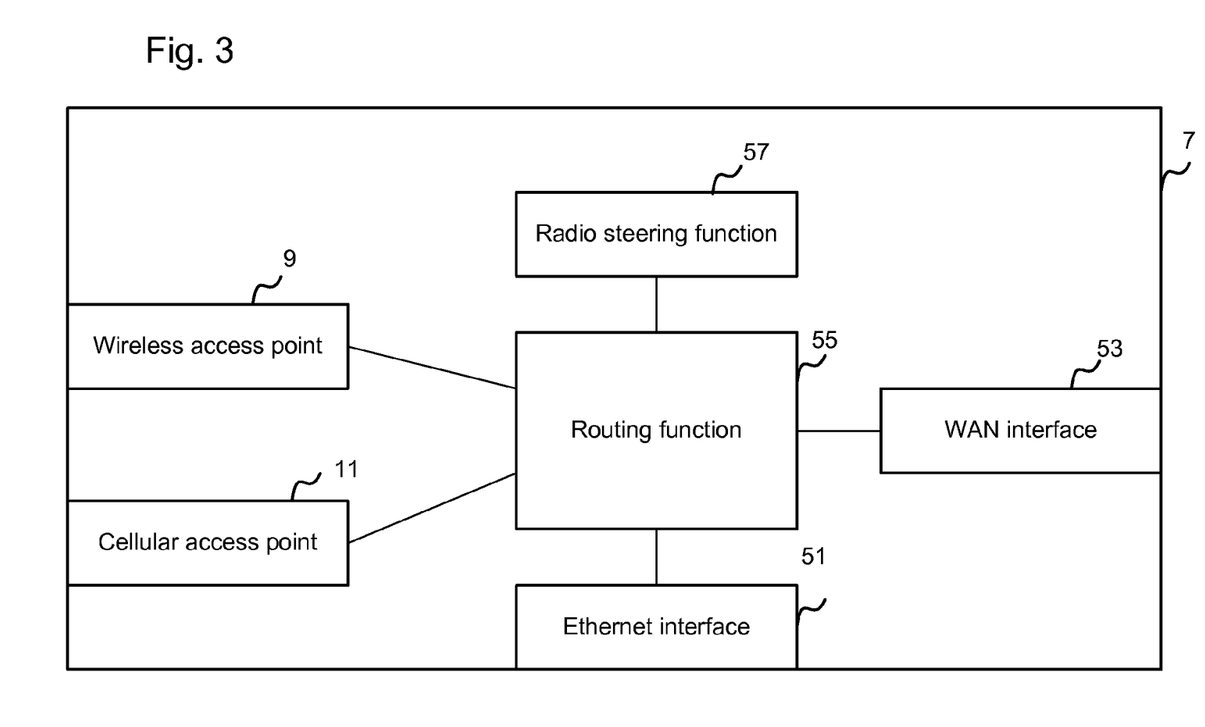
FIG. 3 schematically shows the functional components of the hub device in FIG. 2 in accordance with the first embodiment.

FIG. 3 shows the functional units of the hub 7 when the processor executable instructions stored in the working memory 33 are being executed by the processor 31 and the physical components are configured in accordance with the first embodiment.

The hub 7 includes a WiFi access point 9 function for sending and receiving data packets from WLAN devices using 802.11ac data protocol and, in this embodiment, a small cell function 11 configured to send and receive data packets to/from cellular devices in communication with the hub 7. For wired communication, the hub 7 also includes a wired interface 51 for communication with any local wired devices (not shown) and the hub also has WAN interface 53 for wired communication with external networks.

To connect and coordinate the flow of data packets between the various local network interfaces 9, 11, 51, and the WAN interface 53, the hub 7 includes a packet routing function 55 which is responsible for inspecting the header information of each incoming packet from any of the interfaces, determining the destination of the packet and forwarding each packet to the appropriate network interface 9, 11, 51, 53 for delivery to the destination.

In accordance with the first embodiment, the hub 7 includes processing to decide whether a connected device 5 should use the WiFi access point 9 or the small cell 11 for data communications via the WiFi path 13 or the LTE path 15 with correspondent nodes 19. The decision is based on a number of factors, including the current status of the hub 7 such as whether any other devices (not shown) are transmitting/receiving data which affects the available data capacity available.

Another factor is whether the device 5 is connected to both the WiFi access point 9 and the cellular access point 11 of the hub 7.

Therefore the hub 7 also includes a radio steering function 57 for determining which interface should be used.

Figure 4:
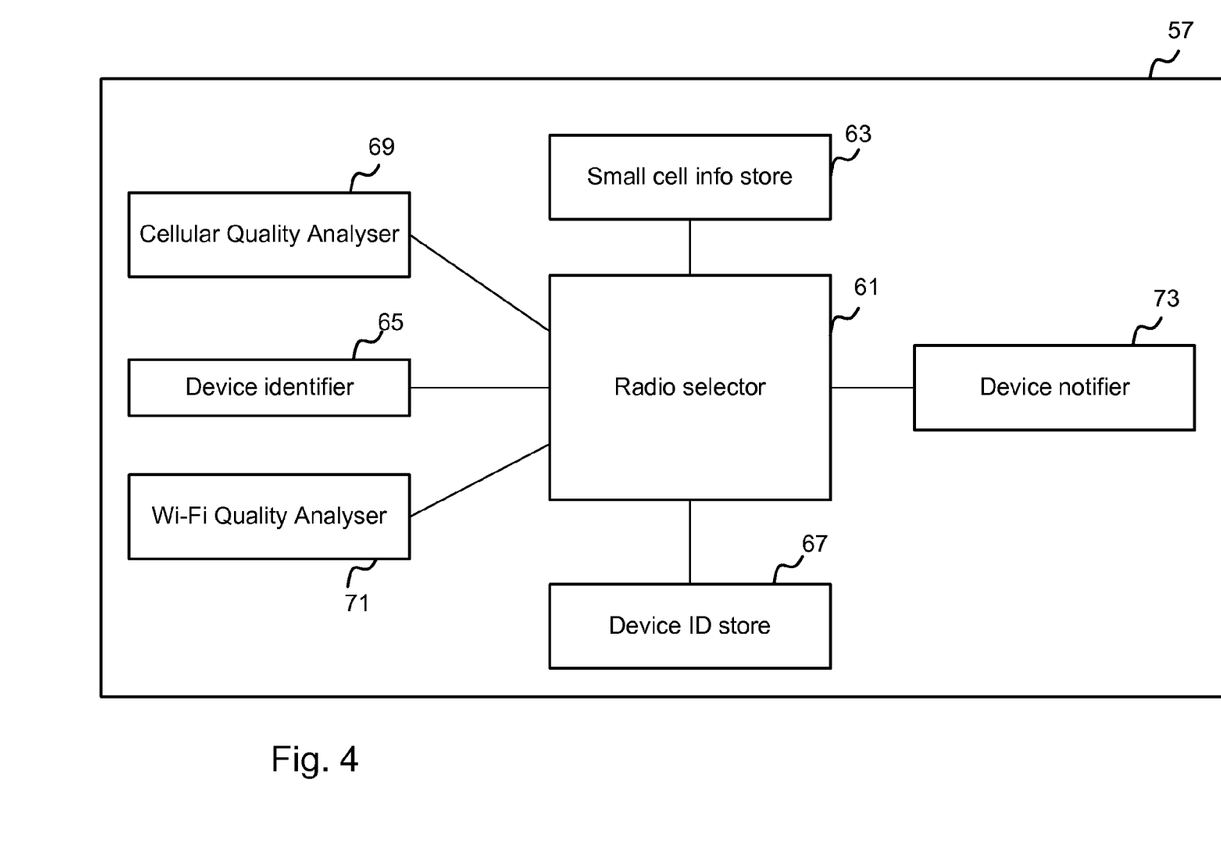
FIG. 4 schematically shows the functional components of a radio steering function of the hub.

FIG. 4 shows the radio steering function 57 in more detail.

The main component of the radio steering function 57 is a radio selector 61 that is connected to a number of inputs and data stores. The data stores include a small cell information store 63, a device information identifier 65, a device identity store 67, a cellular network quality analyzer 69, a WiFi network quality analyzer 71 and a device notifier 73.

In this embodiment, the radio steering function 57 relies on communication with functions in the mobile device 5, therefore the components of the mobile device will now be described before explaining the interaction of the radio steering function 57 and functional components of the mobile device 5.

Figure 5:
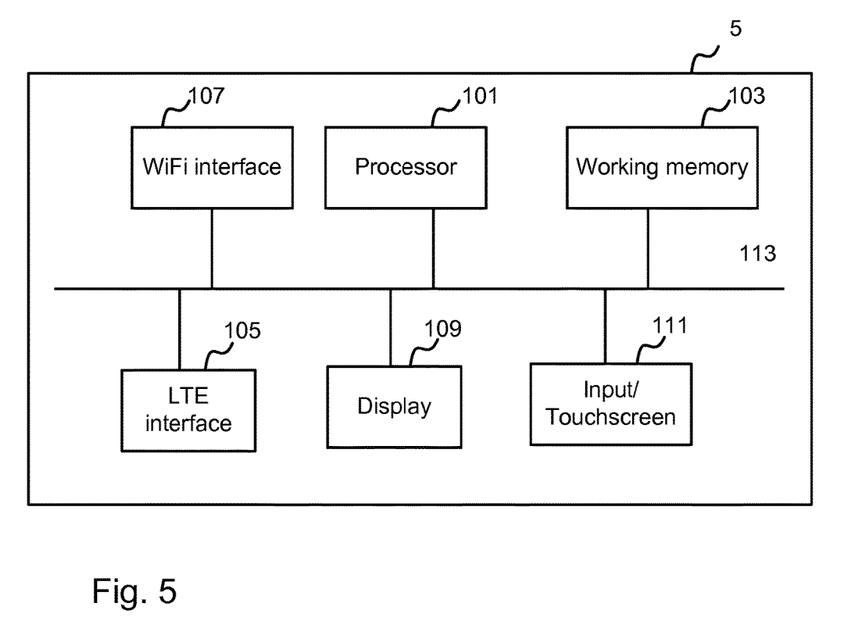
FIG. 5 schematically shows the physical components of a mobile device.

FIG. 5 shows the main functional components of a mobile device in accordance with the first embodiment. The mobile device includes a processor 101, a working memory 103 having both Random Access Memory (RAM) and Read Only Memory (ROM), a cellular network interface 105, a WiFi network interface 107, a display 109 and input device 111 such as a touchscreen. The internal components are connected via common data bus 113.

When processor implementable instructions stored on the working memory 103 are executed by the processor 101, the mobile device 5 can be regarded as a number of functional components.

Figure 6:
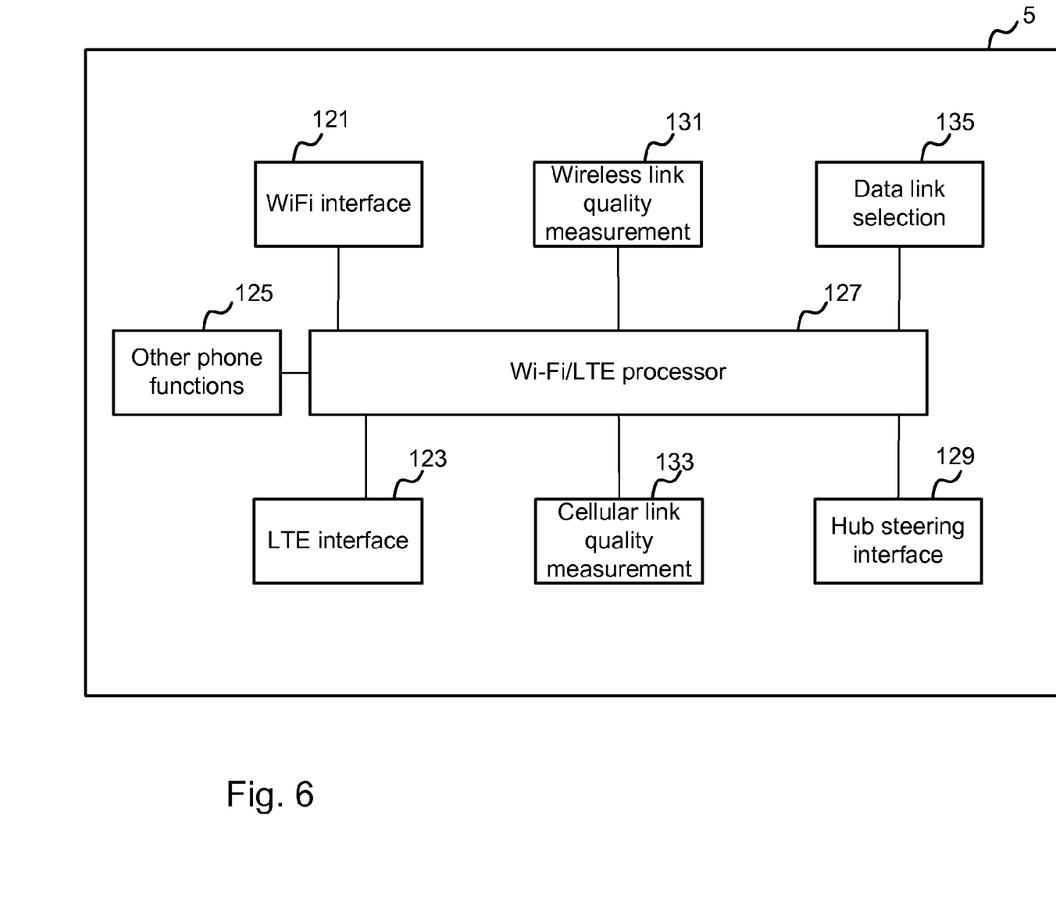
FIG. 6 schematically shows the functional components of the mobile device.

FIG. 6 shows the functional components of the mobile device 5. The mobile device 5 has a LTE interface 121, a WiFi interface 123 and standard mobile device functionality 125 such as phone, data and display functions which are present but do not form part of the present disclosure and will not be described.

In this embodiment, the mobile device 5 contains an application which performs functions to aid the hub 7 in steering the device between a WiFi and LTE data connection, when the application code is executed by the processor 101, the mobile device 5 is configured to also include a WiFi/LTE processor 127, a hub steering interface 129, a wireless link quality measurement function 131, a cellular link quality measurement function 133, and a data link selection store 135.

The LTE interface 121 and WiFi interface 123 include the controller software and hardware for LTE and WiFi data communication respectively.

Now that the components of the mobile device 5 have also been introduced, for ease of explanation, the steering processing of the hub 7 in the first embodiment will be explained in relation to a single mobile device 5 connecting to the hub 7. In practice the hub 7 is operable to provide steering functionality to multiple devices 5.

Returning to FIG. 4 showing the hub 7, the small cell information store 63 contains information about the LTE small cell 11 of the hub 7 which in this embodiment is integrated into the hub 7. In particular it contains LTE operational parameters including the MNC, MCC, tracking area identifier (TAI) and cell ID of the integrated small cell. The small cell information store 63 is also configured with information indicating whether the small cell supports local breakout services. The parameters are obtained from the small cell 11 when the hub 7 is initialized.

Device Identity Information

The device information identifier 65 is responsible for obtaining addressing information and other data relating to the mobile device. The device information identifier 65 interacts with the hub steering interface 129 of the mobile device 5 and provides the radio selector 61 with notifications and information when the mobile device 5 connects to the hub 7. When the mobile device 5 connects via Wi-Fi, the local IP address assigned to the device 5 along with a device name is received by the device information identifier 65 and stored in the device ID store 67 as a mapping between the mobile device's Wi-Fi MAC address and the mobile device's IP address in an Address Resolution Protocol table.

Since the mobile device 5 also has LTE connectivity, it will also have a different set of network addresses when connected to the cellular network core 27 but this information is not directly available to the radio steering function 57. Therefore the hub steering interface 129 of the mobile device 5 is arranged to notify the hub 7 with these parameters.

Upon change of either cellular or Wi-Fi point of attachment by the device 5, the hub steering interface 129 notifies the change to the device information identifier 65. The hub steering interface 129 opens an http connection over Wi-Fi to a pre-defined URL of the device information identifier 65 and presents the tracking area identifier and cell-id of its currently connected cell as a parameter.

The device information identifier 65 notes the IP address of the device 5 making the http request and the tracking area identifier (TAI) and cell-ID (ECI) provided. It will look up the IP address of the device in the ARP table of the device information store 67 and note the corresponding Wi-Fi MAC address. It will then store the MAC address to cell-id mapping in the Device ID store 67 and set a flag in that table to true if the cell-id is the cell-id of the small cell (as stored in the small cell information Store 63), otherwise it sets the flag to false.

An example of the device ID store 67 is shown below.

| Wi-Fi PHY Layer Identifier | IP address on Wi-Fi | TAI/ECI | Connected to this hub |
|---|---|---|---|
| MAC: 5C-F8-A1-11-22-3C | 192.168.1.71 | 23415123/1213 | true |
| MAC: 5C-F8-A1-FF-10-24 | 192.168.1.72 | 23415123/1213 | true |
| MAC: 5C-F8-A1-06-9E-17 | 192.168.1.73 | 234104567/222 | false |

Link Quality

Having populated the Device ID store 67 with address information of the WiFi and LTE address information of the mobile device 5, the radio steering function 57 gathers link quality information for use in deciding which link (WiFi or LTE) should be used by the mobile device 5.

Wi-Fi Connection Quality

A number of parameters are measured periodically by the Wi-Fi Quality Analyzer 71 in the hub 7 regarding overall Wi-Fi channel load and the specific information about the Wi-Fi connection of the particular mobile device in question, using API calls on the drivers for the Wi-Fi interface. Parameters for overall link status include:
  (i) Channel Utilization (same parameter as is broadcast in BSS Load element of 802.11 beacon);
  (ii) Channel noise level Meanwhile for the device 5 specifics, measured parameters include:
  1. Signal strength;
  2. link physical rate (for data or control/management packets);
  3. Downlink physical rate (for data or control/management packets);
  4. RX Bytes (number of received bytes from the mobile device);
  5. RX Packets;
  6. TX Bytes;
  7. TX Packets; and
  8. TX Retries From the collected parameters, further metrics are calculated by the Wi-Fi quality analyzer 71 including:
  Uplink and downlink average data rates are calculated based on the differences between consecutive TX/RX bytes figures (with smoothing over time).
  Percentage packet error rates are calculated as $100 \times (TX\ Retries_{n+1} - TX\ Retries_n)/(TX\ Packets_{n+1} - TX\ Packets_n)$ with smoothing over time
  Individual device channel utilization is estimated by combining info on packets/bytes send and received with info on the physical rates used.

Furthermore in this embodiment, the wireless link quality measurement function 131 of the mobile device 5 is configured to perform similar active speed tests to a predefined URL provided by the WiFi quality analyzer 71 on the hub 7 and provide a device-side view of the connection quality using similar parameters to those measured by the hub 7. The wireless link quality measurement function 127 forwards the results to the Wi-Fi Quality Analyzer 71 of the hub 7 to improve the connection quality estimate.

A Wi-Fi connection quality figure is derived by the Wi-Fi Quality Analyzer 71 from the above data and compared against a predefined poor connection threshold, e.g. a points score for each individual measure specified in a predefined table, and added up across all the measures. If total score is below threshold, the connection is considered poor.

Alternatively a number of separate measures are calculated and individually compared to a set of predefined poor connection performance thresholds, e.g. signal strength <−85 dBm; retry rate >50% and physical rate <5 Mbps. If any measure fails, or a subset of thresholds fail, the connection is considered poor.

The processing of the WiFi quality analyzer 71 is carried out even if the mobile device 5 is no-longer connected to Wi-Fi, e.g. if it has been disassociated because of poor connection quality. The Wi-Fi Quality Analyzer 71 of the hub 7 will continue to monitor the device's Wi-Fi probe requests in order to detect improvements in signal strength, which will be a means of determining whether to steer the device back to Wi-Fi.

On the other hand, if the device is still associated to Wi-Fi but user traffic is being routed over the small cell 11 due to a poor Wi-Fi connection quality decision, then statistics for Wi-Fi management and control packets (including null data packets) are monitored to determine when the connection is no-longer considered poor.

Cellular Connection Quality

In this embodiment, the cellular quality analyzer 69 relies on interaction with the cellular link quality measurement function 133 of the mobile device 5 to provide it with LTE information regarding the cellular link quality for analysis.

In this embodiment, a number of parameters are periodically measured by the cellular link quality measurement function 133 on the mobile device, and passed to the cellular quality analyzer 69 over an http connection over the wireless access point 9. For resilience the data can also be sent to a network server (not shown) within the ISP core 19 and retrieved by the cellular quality analyzer 69 if the Wi-Fi connection is down.

In this embodiment, the following information is gathered by the cellular link quality measurement function 125 and sent to the cellular quality analyzer 69:
  Connected cell id
  Speed test—a http speed test to an internet based server
  LTE signal strength and quality parameters of the device's cellular connection: RSRP and RSRQ (Reference Signal Received Power and Reference Signal Received Quality)

Traffic Steering Decision

The radio selector 61 is responsible for selecting the data link type that should be used by the mobile device using the device ID information, Wi-Fi link quality and cellular link quality parameters. The radio selector 61 compares the quality of the available connections and, based on a predefined policy and rules, makes a decision over which connection to select, taking into account not only information from the individual device, but all the information gathered about the each connected device and the overall conditions, including loading, on each radio interface.

In general, the WiFi connection is considered to be the default preferred link unless the LTE link is determined to be significantly better. For example the decision policy could be:

Choose LTE if:
(
LTE Cell ID is a member of the set of BT Cell IDs
)
AND
(

```
(
    The LTE speed test result > 1.5* WiFi Speed Test Result
    AND
    the LTE RSRP > −100dBm
)
OR
(
    WiFi RSSI < −85 dBm
)
)
AND
(
WiFi RSSI < −55 dBm
)
AND
(
Total load on LTE Cell <70%
)
ELSE
choose Wi-Fi
```

In the first embodiment, the radio selector 61 is configured to determine the preferable radio link on device connection, but also periodically, such as every 5 minutes, to account for variations in link quality and stability.

Traffic Steering Implementation

Once the radio selector 61 has determined a link for use, the device notifier 73 is responsible for informing the mobile device 5 of the decision so that action can be taken by the mobile device 5.

In this embodiment, the device notifier 73 uses two different methods, using hub singaling or communicating via the hub steering interface 131 of the mobile device 5.

In the first method, the device notifier 73 uses a mobile device's standard bias to use WiFi whenever possible in preference to cellular data.

If the decision is to use LTE:

The device notifier 73 sends the hub steering interface 129 of the mobile device 5 a message of the decision to use WiFi and the result is stored in the data link selection store 135. Furthermore, the device notifier 73 issues a WiFi BSS Transition Management Frame to the mobile device 5 requesting the device to disassociate from WiFi, with an empty candidate list of alternative Wi-Fi APs. The device notifier 73 also configures the wireless access point 9 of the hub 7 to reject subsequent association attempts by the mobile device 5 until the radio selector 61 decides that Wi-Fi has become the preferred link.

For Passpoint R2 enabled mobile devices, an alternative is to send the device a Deauth frame, specifying a minimum time before the device retries.

If the decision is to use Wi-Fi:

The device notifier 73 sends the decision to the data link selection store 135 configures the Wifi interface 121 to Accept (or stop rejecting) association requests from the mobile device 5 when it next attempts to connect.

Using an Application to Implement Traffic Steering Decision

In a second mode of operation, the device notifier 73 sends a message to the WiFi/LTE processor 127 of the mobile device 5 via the hub steering interface 131, indicating the chosen radio access.

If the decision is to use LTE:

In response to an instruction to use LTE, the WiFi/LTE processor 127 causes the WiFi interface 121 to disconnect the Wi-Fi connection, or modifies a routing table in the data link selection store 135 so that the mobile device 5 routes data from applications over the LTE interface 123.

If the decision is to use Wi-Fi:

In response to an instruction to use WiFi, the WiFi/LTE processor 127 forces the WiFi interface to reconnect to Wi-Fi (if it is currently disconnected) and/or adjusts the routing table to route all (or selected) traffic over Wi-Fi.

The WiFi/LTe processor 127 can also be configured with a routing policy enabling selective routing of traffic flows over cellular and over Wi-Fi.

In accordance with the processing of the first embodiment, a hub 7 directs any connected devices to use either WiFi or LTE for data connectivity so that no changes are required to the functioning of the mobile devices beyond installation of an application to communicate information to the hub. Furthermore the radio selection is managed by the combined small cell/Wi-Fi access point which has access to more detailed information about the performance of the various data links upon which to base a selection decision rather than just information about an individual device's connection. Therefore a better decision, optimized across all connected devices can be determined, rather than a poor decision made on limited information concerning a single device's connectivity.

Alternatives and Modifications

In the embodiment the small cell 11 is integrated with the hub 7 and therefore the operational parameters and status information which are not retrieved from the mobile application are retrieved from the hub. In an alternative, the hub 7 does not include an integrated small cell but is instead connected to a separate small cell 11 via the Ethernet connection. Since any communication from the small cell to the cellular network core is sent in an encrypted data tunnel, the operational parameters will not be available. Therefore the initial parameters are sent to the hub into the cell information store from the ISP core via TR-069.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A wireless access point device for selecting a data communication interface to be used by a mobile device, the mobile device having at least a wireless local area network interface for connecting to a wireless local area data network associated with the wireless access point device and a cellular network interface for connecting to a cellular data network, the wireless access point device being configured to send and to receive data packets to and from the wireless local area network interface and the cellular network interface of the mobile device and for communicating the data packets on to a plurality of wide area networks, the wireless access point device comprising:
   a wireless local area network interface;
   a cellular network access base station;
   a processor with executable instructions stored in memory providing a radio steering function including:
      a device information identifier for communicating with an application operating on the mobile device to retrieve network address identifiers associated with the wireless local area network interface and with the cellular network interface of the mobile device;
      an association analyzer for associating the retrieved network address identifiers with the mobile device;
      a wireless analyzer for determining first network operation parameters of the wireless local area data network;
      a cellular analyzer for determining second network operation parameters of the cellular network interface of the mobile device;
   a controller for selecting one of the wireless local area network interface or the cellular network interface associated with the mobile device as a selected network interface in accordance with the determined first and second network operation parameters, and for causing the mobile device to use the selected network interface for any existing and new data sessions, wherein, in response to the controller, the mobile device is operable to use the selected network interface and to disconnect from the other of the wireless local area network interface or the cellular network interface that was non-selected and that was associated with the mobile device.

2. The wireless access point device according to claim 1, wherein the network address identifier includes a Medium Access Control address and an Internet Protocol address of the mobile device on a wireless data network.

3. The wireless access point device according to claim 1, wherein the network address identifier includes a tracking area identifier and cell-id identifier for the mobile device on a cellular network.

4. A method of selecting a data communication interface to be used by a mobile device having at least a wireless local area network interface for connecting to a wireless local area data network and a cellular network interface for connecting to a cellular data network, the method being performed by a wireless access point device configured to send and to receive data packets to and from the wireless local area network interface and the cellular network interface of the mobile device and for communicating the data packets on to a plurality of wide area networks, the method comprising:
   communicating with an application operating on the mobile device to retrieve network address identifiers associated with the wireless local area network interface and with the cellular network interface of the mobile device;
   associating the retrieved network access identifiers with the mobile device;
   determining first network operation parameters of the wireless data network;
   determining second network operation parameters of the cellular network interface of the mobile device;
   selecting one of the wireless network interface or the cellular network interface associated with the mobile device as a selected network interface in accordance with the determined first and second network operation parameters; and
   causing the mobile device to use the selected network interface for any existing and new data sessions, wherein, in response, the mobile device is operable to use the selected network interface and disconnect from the other of the wireless local area network interface or the cellular network interface that was non-selected and that was associated with the mobile device.

5. The method according to claim 4, wherein the network address identifier includes a Medium Access Control address and an Internet Protocol address of the mobile device on a WiFi wireless data network.

6. The method according to claim 4, wherein the network address identifier includes a tracking area identifier and cell-id identifier for the mobile device on a cellular network.

7. A non-transitory computer-readable storage medium storing a computer program element comprising computer program code to, when loaded into a computer system and executed thereon, cause the computer to perform the method as claimed in claim 4.

* * * * *

UNITED STATES PATENT AND TRADEMARK OFFICE
CERTIFICATE OF CORRECTION

PATENT NO. : 10,231,177 B2  
APPLICATION NO. : 15/561450  
DATED : March 12, 2019  
INVENTOR(S) : Ringland et al.

Page 1 of 1

It is certified that error appears in the above-identified patent and that said Letters Patent is hereby corrected as shown below:

In the Specification

Column no:5, Line(s):66: "LTE interface 121" to read as -LTE interface 123-

Column no:5, Line(s):67: "WiFi interface 123" to read as -WiFi interface 121-

Column no:6, Line(s):13: "LTE interface 121" to read as -LTE interface 123-

Column no:6, Line(s):13: "WiFi interface 123" to read as -WiFi interface 121-

Column no:7, Line(s):61: "wireless link quality measurement function 127" to read as -wireless link quality measurement function 131-

Column no:9, Line(s):32: "hub steering interface 131" to read as -hub steering interface 129-

Column no:9, Line(s):60: "hub steering interface 131" to read as -hub steering interface 129-

In the Claims

Column no:11, Line(s):52, Claim 2: "the network address identifier includes" to read as -the network address identifiers include- Column no:12, Line(s):4, Claim 3: "the network address identifier includes" to read as -the network address identifiers include- Column no:12, Line(s):40&41, Claim 5: "the network address identifier includes" to read as -the network address identifiers include- Column no:12, Line(s):44&45, Claim 6: "the network address identifier includes" to read as -the network address identifiers include- Signed and Sealed this  
Eighth Day of October, 2019

Andrei Iancu  
*Director of the United States Patent and Trademark Office*